3,058,879
ACARICIDAL AND OVICIDAL AGENTS

Hugo Malz and Richard Wegler, Leverkusen, and Günter Unterstenhöfer, Opladen, Germany, assignors to Farbenfabriken Bayer Aktiengesellschaft, Leverkusen, Germany, a corporation of Germany
No Drawing. Filed Sept. 16, 1959, Ser. No. 840,253
Claims priority, application Germany Oct. 3, 1958
6 Claims. (Cl. 167—33)

The present invention relates to and has as its objects new and useful pesticidal agents with acaricidal and ovicidal action containing as active ingredients compounds of the following general formula

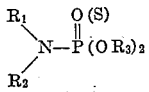

in which $R_1$ and $R_2$ stand for hydrogen, alkyl or alkenyl radicals, $R_1$ and $R_2$ together with the nitrogen atom may also form a 5- or 6-member ring system, which also may be interrupted by further hetero atoms; $R_1$ furthermore may be a lower alkylene radical bearing another

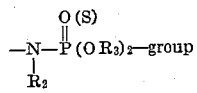

$R_3$ at last stands for a halo-substituted phenyl radical.
This invention further relates to the protection of plant against attack by the above mentioned pests.

In accordance with the present invention it has been found that these compounds show an exceedingly strong acaricidal and especially ovicidal activity. Since this activity also exists against pests which have become resistant to plant protective agents based on present commerical phosphoric acid esters, these agents may effectively be used for combating, for example, spider mites in which such resistance phenomena have chiefly been observed.

As acaricidal or ovicidal plant protective agents in the sense of the present invention there are chiefly to be considered the above amidophosphoric acid or amidothiophosphoric acid esters of the following formula

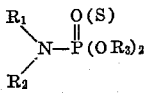

More particularly in this formula $R_1$ and $R_2$ denote similar or different radicals such as hydrogen or a saturated or unsaturated alkyl radical which eventually may be substituted. $R_1$ and $R_2$ may also form a heterocyclic ring together with the nitrogen atom, for example an ethylene imine, morpholine, thiamorpholine, piperazine or piperidine ring. Finally, $R_1$ may also denote an alkylene such as a methylene, ethylene or propylene radical serving for the linkage of two molecule radicals of the above formula via nitrogen atoms. The alkylene chain also may be interrupted by heteroatoms such as nitrogen, oxygen, sulfur and the like. As substituents for $R_1$ or $R_2$ there may be considered inter alia halogens, amino groups, ether or thioether radicals and the like. $R_3$ in the above formula denotes a halophenyl radical which may furthermore be substituted by nitro or amino groups, but also by alkyl, alkoxy, alkylmercapto, sulfoxide, sulfone groups and the like.

The compounds according to the invention are crystalline products or oily, in some cases distillable liquids. Some are known from the literature, e.g. from U.S. Patents 2,615,038 and 2,615,037. If they are novel they may be prepared exactly by the same methods as they are known for the preparation of the known substances.

The production thus is carried out by reacting the corresponding diphenyl ester monochlorides of phosphoric acid or thiophosphoric acid with ammonia or the corresponding amines in an aqueous or inert medium, or also by esterification of the corresponding amido- or amidothiophosphoric acid dichlorides with the corresponding phenols or alkali metal phenolates. In this case it is expedient to add the acid chlorides dropwise to aqueous solutions of the phenolates or to aqueous-alkaline solutions of the phenols. All compounds according to the invention are barely water-soluble and can therefore be separated in a simple manner from the aqueous mother liquors.

The plant protective agents claimed are applied in usual manner in the form of solutions or dusts. As solid extenders or diluents for dusts there are chiefly to be considered talc, chalk, bentonite, kieselguhr and the like. When emulsifiable dusts are to be prepared, it is advisable to use suitable emulsifiers, particularly those having a non-ionogenic basis such as aryl-hydroxy-polyglycol ethers of which various types are on the market.

For the preparation of liquid combinations it is possible to employ solutions of the phosphoric acid or thiophosphoric acid esters to be used according to the invention not only in suitable inert organic solvents, but also in water in combination with suitable emulsifiers and auxiliary solvents. Organic solvents are for example alcohols, hydrocarbons, chiefly chlorinated low molecular weight hydrocarbons such as chloroform, trichloro-ethylene and the like. For the preparation of aqueous dilutions it is advantageous to start from a mixture of active substance, emulsifier, auxiliary solvent, the auxiliary solvents chiefly to be considered being dimethylformamide, acetone, xylene or o-dichlorobenzene and the emulsifiers used being those described above.

The agents are aplied in the manner customary for other phosphoric acid esters.

The following examples are given for the purpose of illustrating the invention.

Example 1

Test on spider mites (*Tetranychus telarius*) which are highly resistant to organic phosphoric acid esters.

Bean plants which were strongly infested with spider mites of all stages of development were sprayed with aqueous emulsions at various concentrations of the following active substance.

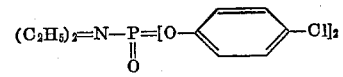

The emulsions were prepared with the use of same amounts by weight of acetone and a commercial benzyl-hydroxy-diphenyl polyglycol ether-emulsifier type.

| Percent active substance (pure active subst. in aqueous emulsion) | Percent mortality of movable stages after 48 hours | Degree of infestation after 8 days |
|---|---|---|
| 0.05 | 80 | 0 |
| 0.025 | 20 | 0 |
| 0.0125 | 10 | 2 |

Mortality of movable stages after 48 hours means that all pests which still showed some movement were counted as living pests.

The damage of infestation has been counted by the damaging numbers.

0=no damage
1=very slight infestation

2=slight infestation
3=medium infestation
4=heavy infestation
5=very heavy infestation.

*Example 2*

Ovicidal action against eggs of highly resistant spider mites (*Tetranychus telarius*):

Eggs on *Phaseolus vulgaris* (string beans) which were 24 hours old were sprayed with aqueous emulsions of the above mentioned active substance and the mortality was determined after 8 days.

| Percent active substance (pure active subst. in aqueous emulsion) | Percent killed after 8 days |
|---|---|
| 0.05 | 97 |
| 0.025 | 50 |

The emulsions have been prepared as described in Example 1.

*Example 3*

Permanent ovicidal action against eggs of highly resistant spider mites (*Tetranychus telarius*):

In order to determine the permanent effect of the above mentioned compound, sprayed bean plants were infested after 24 hours, 3 days and 9 days with females laying eggs on the sprayed plants. The table shows the percentage of eggs killed which had been laid during the aforesaid periods.

| Percent active substance | Percent eggs killed which had been laid after— | | |
|---|---|---|---|
| | 24 hours | 3 days | 9 days |
| 0.05 | 97 | 94 | 41.5 |
| 0.025 | 50 | 38 | 32.5 |

The emulsions have been prepared as described in Example 1.

Similarly good combating results can be achieved with the use of other representatives of the claimed class of compounds. In the following table some of these compounds are listed by way of example, without however limiting the claimed class of compounds in any way by this compilation.

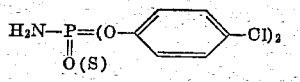
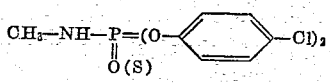
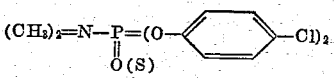
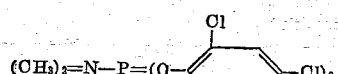
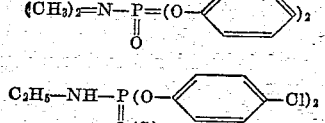

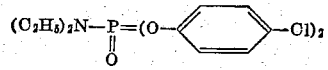
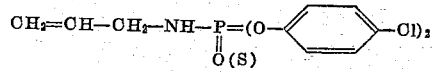
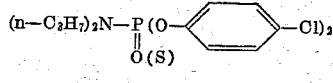
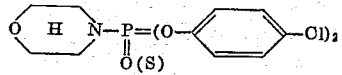
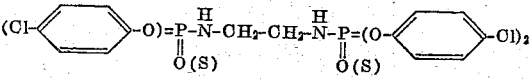

We claim:

1. A method of combating mites and eggs thereof on a plant which comprises treating the plant with an active amount of a compound of the following formula

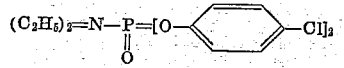

2. A method of combating mites and eggs thereof on a plant which comprises treating the plant with an active amount of a compound of the following formula

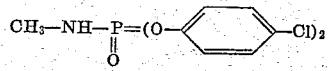

3. A method of combating mites and eggs thereof on a plant which comprises treating the plant with an active amount of a compound of the following formula

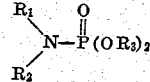

in which $R_1$ stands for a member selected from the group consisting of hydrogen, a lower alkyl, a lower alkenyl and

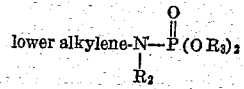

$R_2$ stands for a member selected from the group consisting of hydrogen, lower alkyl and lower alkenyl; and when $R_1$ and $R_2$ are taken together with the nitrogen atom, they form a member selected from the group consisting of ethyleneimino, morpholino, thiamorpholino, piperazino and piperidino radicals; and $R_3$ stands for a halo-substituted phenyl radical.

4. An acaricidal and ovicidal agent containing
 (a) an active substance of the group of amidophosphoric acid diaryl esters of the following formula

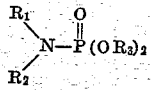

in which $R_1$ stands for a member selected from the group consisting of hydrogen, a lower alkyl, a lower alkenyl and

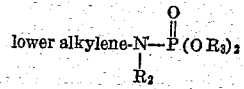

$R_2$ stands for a member selected from the group consisting of hydrogen, lower alkyl and lower alkenyl; and when $R_1$ and $R_2$ are taken together with the nitrogen atom, they form a member selected from the group consisting of ethyleneimino, morpholino, thiamorpholino, piperazino and piperidino radicals; and $R_3$ stands for a halo-substituted phenyl radical;

(b) a commercially non-ionic emulsifier;
(c) an auxiliary solvent;
(d) water.

5. An acaricidal and ovicidal agent containing
(a) an active substance of the following formula

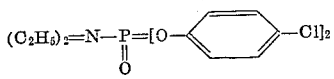

(b) a commercially non-ionic emulsifier;
(c) an auxiliary solvent;
(d) water.

6. An acaricidal and ovicidal agent containing
(a) an active substance of the following formula

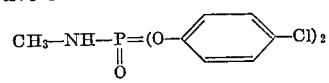

(b) a commercially non-ionic emulsifier;
(c) an auxiliary solvent;
(d) water.

References Cited in the file of this patent

UNITED STATES PATENTS

| | | |
|---|---|---|
| 2,615,037 | Moyle | Oct. 21, 1952 |
| 2,615,038 | Moyle | Oct. 21, 1952 |
| 2,615,039 | Drake | Oct. 21, 1952 |
| 2,635,112 | Fields | Apr. 14, 1953 |
| 2,759,937 | Du Breuil | Aug. 21, 1956 |
| 2,802,823 | Tolkmith et al. | Aug. 13, 1957 |
| 2,862,017 | Schrader et al. | Nov. 25, 1958 |
| 2,994,638 | Malz et al. | Aug. 1, 1961 |

OTHER REFERENCES

Sexton: "The Organic Chemist's Approach to Chemotherapy," pages 1–13 of "Selective Toxicity and Antibiotics," Society of Experimental Biology (S.E.B.) Symp. No. III, vol. III, 1949.